United States Patent [19]

Smith et al.

[11] 3,851,972

[45] Dec. 3, 1974

[54] AUTOMATIC METHOD AND SYSTEM FOR ANALYSIS AND REVIEW OF A PLURALITY OF STORED SLIDES

[75] Inventors: Lester C. Smith, Newton Upper Falls; Garret F. Ziffer; John Russell Nelson, both of Natick, all of Mass.

[73] Assignee: Coulter Electronics Inc., Hialeah, Fla.

[22] Filed: Oct. 18, 1973

[21] Appl. No.: 407,538

[52] U.S. Cl. .......... 356/72, 350/81, 356/39, 356/73, 356/201

[51] Int. Cl. .......... G01n 21/00, G01n 33/16

[58] Field of Search .......... 356/36, 39, 72, 73, 201; 350/81

[56] References Cited

UNITED STATES PATENTS 3,533,744 6/1974 Unger .......... 356/39

*Primary Examiner*—Vincent P. McGraw
*Attorney, Agent, or Firm*—Silverman & Cass, Ltd.

[57] ABSTRACT

A method and system for automatically reviewing slides having biological cells thereon which include a sequencer for developing a sequence of first control signals and a sequence of second control signals. A scanning device operates in response to the first control signals to access sequentially slides to be studied in a storage device which stores a number of the slides. The scanning device locates particular areas on each slide in response to the second control signals. An analyzer device analyzes each cell located in the particular area on a slide and develops a detect signal in response to cells having characteristics other than particular cell characteristics. A memory stores the last developed first and second control signals, indicating slide storage location and cell location in a storage location in response to the detect signal. The sequencer is operative in response to a review signal to access sequentially each storage location containing information and couple the first and second control signals located therein to the scanning device. The scanning device operates in response to the first and second control signals to access again the slide and locate the particular area of the cell thereon.

32 Claims, 4 Drawing Figures

AUTOMATIC METHOD AND SYSTEM FOR ANALYSIS AND REVIEW OF A PLURALITY OF STORED SLIDES

BACKGROUND OF THE INVENTION

Biological cell analyzers currently available are capable of analyzing and identifying a number of different blood cells on a slide and recording this information. For example, the analyzer may be capable of analyzing lymphocytes, monocytes, eosinophils and basophils. Certain types of analyzers are capable of analyzing, identifying and recording six or seven types of white blood cells. In all blood samples there can be a number of atypical or juvenile forms, as well as foreign matter such as dirt or bacteria. These atypical or juvenile types, and the foreign matter, are analyzed as unidentifiable. A technician must then visually inspect each unidentifiable cell, as it is analyzed, and identify it in order to complete a cell study.

A number of slides can be coupled, automatically and sequentially to certain analyzers. Each slide is scanned by the analyzer and all identifiable and unidentifiable cells are recorded in a memory, along with the location on the slide of each unidentifiable cell. The scanning process can take approximately 90 seconds. After a slide is scanned, the analyzer can be activated to recall sequentially from memory the location of each unidentifiable cell on that slide and automatically scan to the location of that cell. A technician then can visually inspect the unidentifiable cell and classify it in order to complete the analysis.

Although analyzers such as described above have been used to advantage, both have the disadvantage that a technician must be present as each slide is being analyzed or rescanned in order to complete the analysis of the blood sample on the slide. The technician is prevented therefore from engaging in other profitable or productive work while each slide, or a cassette of slides, is being analyzed.

SUMMARY OF THE INVENTION

It is therefore an object of this invention to provide an automated biological cell analyzing method and system for analyzing sequentially a number of slides having cells thereon, identifying and recording the area on a slide of each unidentifiable cell, and, after all slides have been analyzed, automatically reaccessing each slide having unknown cells thereon and automatically locating the unknown cell area for a visual analysis.

It is another object of this invention to reaccess automatically slides with cells having particular identifiable cell characteristics and locate the area on the slide of each such cell on the slide for visual observation.

In practicing this invention the biological cell analyzing method is provided for automatically reviewing previously analyzed slides having cell samples thereon. The analyzing system includes a cassette for storing a number of slides, each containing cells, such as blood cells thereon to be analyzed. A sequencer develops a sequence of first control signals and a sequence of second control signals. A slide storage retrieval mechanism operates in response to each first control signal to access a particular slide location in the cassette and couple the slide to a microscope. The microscope is responsive to each second control signal in the sequence of second control signals to focus on a particular area of the slide. A cell analyzer, coupled to the microscope, scans the slide area analyzes and identifies the characteristics of cells found therein. If an unknown cell or foreign matter is detected, a detection signal is coupled to the sequencer. The sequencer then couples the last developed first and second control signals to an information memory for storage in a particular storage location. After analysis of every slide in the cassette, a review cycle can be initiated by actuating a review switch on a keyboard. The sequencer operates in response to actuation of the review switch to access sequentially each storage location containing first and second control signals, access the appropriate slide in response to the first control signal in the storage location and couple the slide to the microscope for visual observation.

The cell location information is provided via a readout mechanism, such as a visual display in order to provide the operator with precise information for the particular cell on the slide. The second control signal coupled to the sequencer from the information memory is coupled to the microscope for automatically locating the precise area of the cell on the slide.

This system can also be implemented to include provision for storing slide identification and cell location information of each cell having particular identifiable characteristics. Upon initiation of the review cycle, each slide having cells with the particular identifiable characteristics will be accessed sequentially and coupled to the microscope, then the particular cell area on the slide will be located for visual observation.

DESCRIPTION OF THE PREFERRED EMBODIMENT

Figure 1:
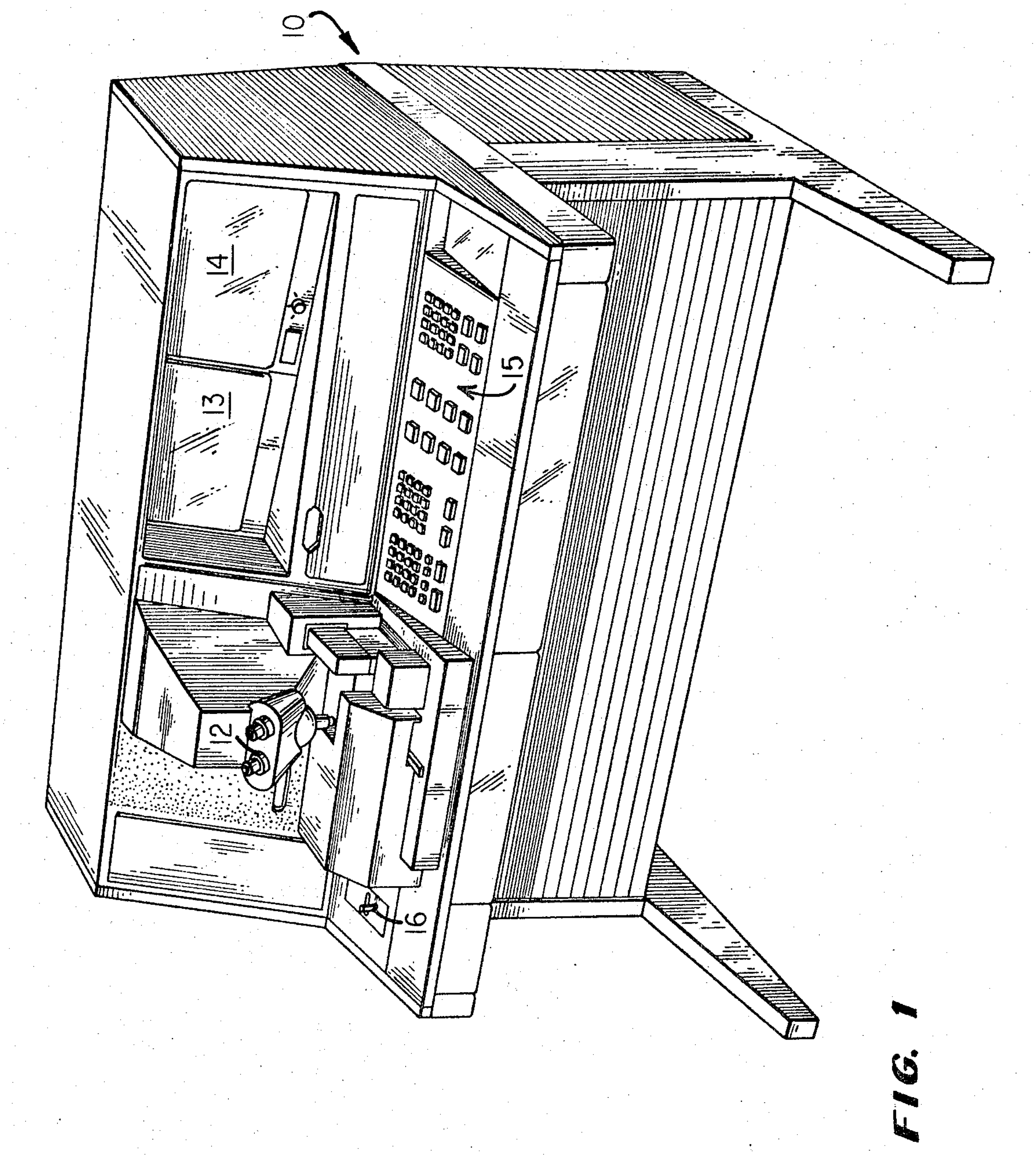
FIG. 1 is a perspective drawing of the biological cell analyzing system of this invention mounted in a console.
Figure 2:
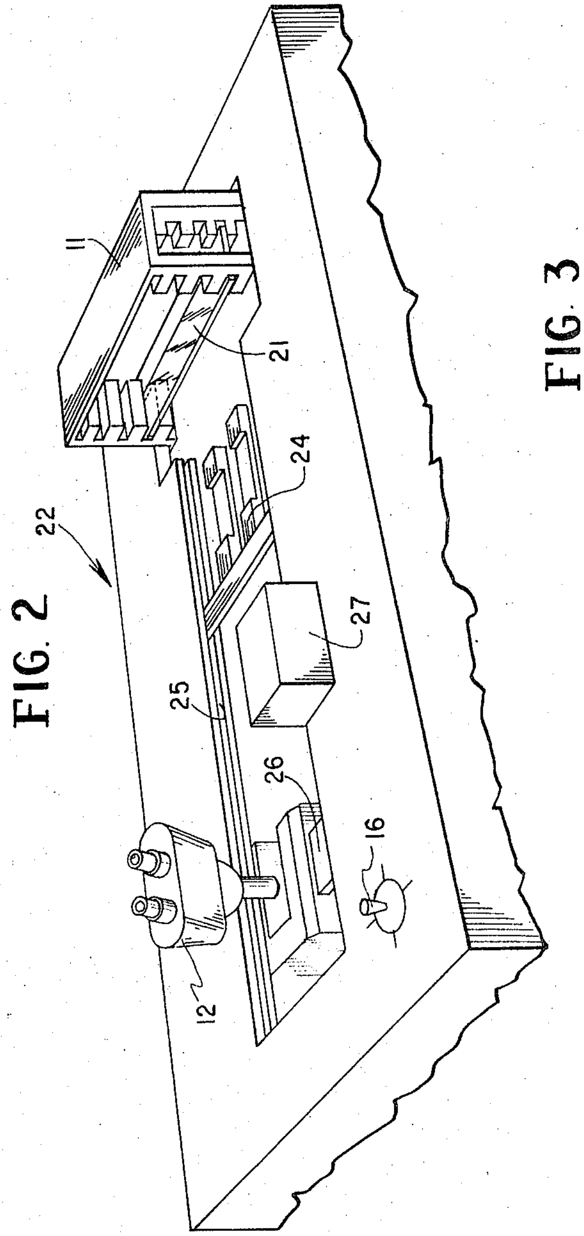
FIG. 2 is a more detailed showing of the slide cassette and slide storage and retrieval mechanism.

Referring to FIG. 1, the subject automatic biological cell analyzer can be mounted in a console 10. A cassette 11 containing a number of slides (not shown) of cell samples to be analyzed is mounted in the console 10. Microscope 12 provides magnification and visual observation facilities for study of the cells on each slide. In addition, a visual observation system including a video camera (not shown) and TV monitor 13 allows for observation of the slide areas magnified by microscope 12. Cathode ray tube 14 provides a visual readout of information stored in an information memory within console 10. A keyboard 15 allows for the manual initiation of a number of functions by the analyzer as more fully explained subsequently herein. Control stick 16 allows the microscope field of vision to be moved to particular areas on the slide being studied.

Figure 3:
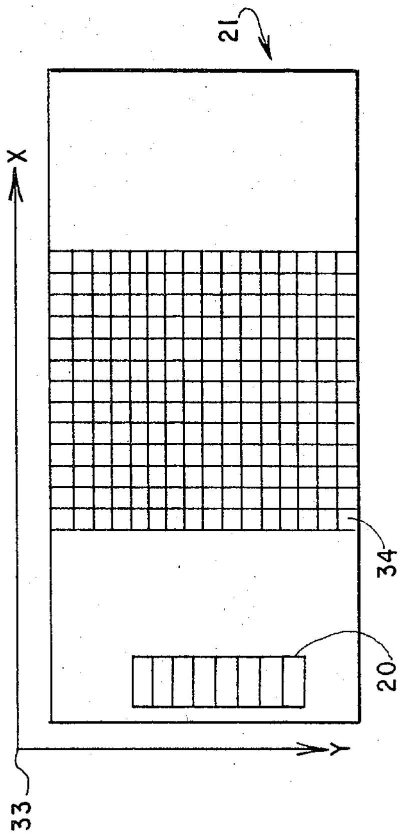
FIG. 3 is a drawing of a slide used in this system.

In operation, slide identification indicia 20 (FIG. 3) are provided on a slide 21 containing a cell sample, such as a blood smear to be analyzed. The slide identification indicia for example, can be a series of coded colors. It also can consist of a series of raised areas, coded to identify the slide and its location in cassette 11. The slide identification indicia 20 can be cross referenced to the person from whom the blood sample was taken. The thus identified slides are loaded into cassette 11 which then is mounted into slide storage retrieval mechanism 22 in console 10 and the start analysis button 19 (FIG. 4) on control panel 15 is actuated.

Upon actuation of start analysis button 19, a start signal is coupled to routine sequencer 23 (FIG. 4) to initiate operation and develop a first control signal which is coupled to slide storage retrieval mechanism 22. Upon receipt of the first control signal, slide storage retrieval mechanism 22 will move slide carriage 24 into a load position into cassette 11. The first slide 21 in cassette 11 will be moved to a load position dropping the slide into slide carriage 24. Slide carriage 24 then moves via track 25 to a position adjacent microscope slide table 26 and deposits slide 21 on table 26. As slide 21 moves to the microscope slide table 26 it passes slide indicia reader 27 which reads the slide identification indicia 20 and converts this to digital information for storage in a memory.

When slide 21 is positioned on microscope slide table 26, routine sequencer 23 will develop a second control signal. The second control signal is coupled to slide table positioning mechanism 30, microscope optical scanner 31 and cell characteristic analyzer 32. Slide table positioning mechanism 30 will respond to the second control signal to move a particular area of slide 21 into the viewing field and field of magnification of microscope 12. That is, the second control signal is associated with a particular XY coordinate 33 to which slide table 26 moves. Each XY coordinate 33 defines a particular area 34 on slide 21. In the preferred embodiment, area 34 is a very small area which, when magnified by microscope 12, will display at least one white blood cell, or other biological cell of interest.

Figure 4:
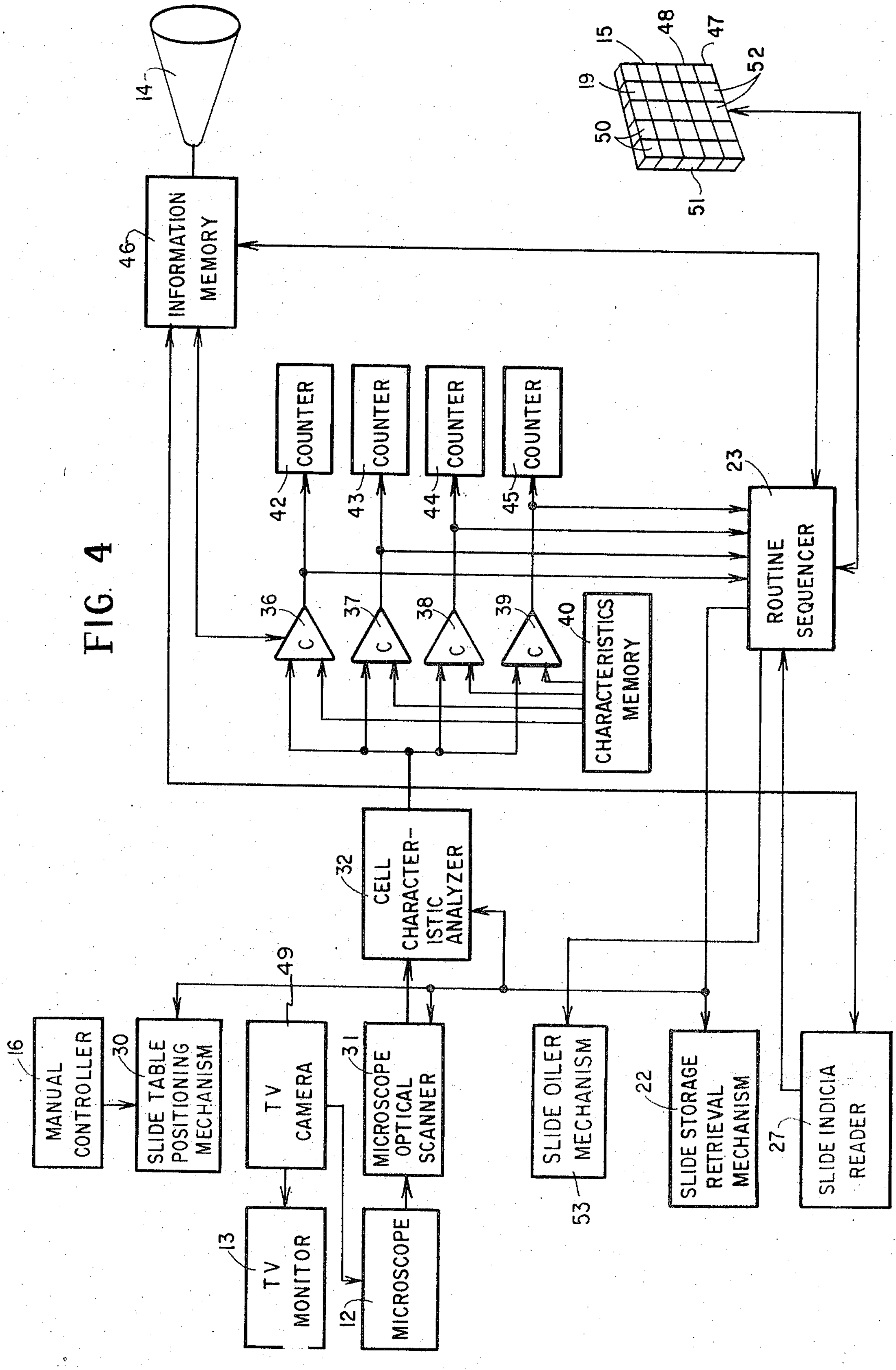
FIG. 4 is a block diagram of the cell analyzer system.

Microscope optical scanner 31, upon receipt of the second control signal, will scan optically the area of slide 21 moved into the field of magnification of microscope 12 by slide table positioning mechanism 30. Microscope optical scanner 31 will develop optical scanning signals, in response to the presence of a cell within the scanned area, which signals are coupled to cell characteristic analyzer 32. Cell character analyzer 32, upon receipt of the second control signal, will analyze the optical scanning signals coupled from microscope optical scanner 31 and develop data signals such as in a binary signal format, representing characteristics of the cell being scanned. The binary signals can define a binary word which will represent characteristics such as shape, optical density, nuclear area, cytoplasm area, color, etc. of the cell being scanned. The binary signals representing the cell characteristics are coupled from cell characteristic analyzer 32 to comparators 36 through 39. Although four comparators are shown in FIG. 4, as many comparators can be employed as there are different type cells to be identified. Comparators 36 through 39 compare the binary signals coupled from cell characteristic analyzer 32 with binary signals, coupled to each comparator 36 through 39 from separate storage areas in characteristics memory 40. Each storage area in characteristics memory 40 contains binary signals representative of the composite characteristics of a particular type of biological cell, such as a white blood cell. For example, the first storage area can contain binary signals representing the shape, optical density, nuclear area, cytoplasm area, and color of a segmented neutrophils. The second storage area can contain binary signals representing the characteristics of lymphocytes. If a correlation occurs in any one of comparators 36 through 39 between the binary signals coupled from cell characteristic analyzer 32 and the binary signals coupled from characteristics memory 40, that particular comparator will develop a comparison signal. The comparison signal will be coupled to one of counters 42 through 45 each one being associated with one of comparators 36 through 39. The counter to which the comparison signal is coupled will count the comparison signal, thereby counting the number of cells analyzed having those particular cell characteristics.

The outputs of comparators 36 through 39 also are coupled to routine sequencer 23. At the end of a cell analysis, cell characteristic analyzer 32 will couple a analysis complete signal to routine sequencer 23. If routine sequencer 23 has not received a comparison signal from one of comparators 36 through 39, it will develop a first detect signal which is coupled to information memory 46.

Information memory 46 contains a number of storage locations. The first detect signal will cause information memory 46 to access routine sequencer 23 and couple the last developed first and second control signals developed by routine sequencer 23 to an empty storage location in information memory 46. As previously noted, the first and second control signals coupled to information memory 46 indicate the slide location in cassette 11 and the XY coordinates of a particular area 34 on slide 21. Comparator 36 will be accessed by information memory 46 and the binary signals defining the binary word which represents the characteristics of the scanned cell will be stored in the storage location. Information memory 46 also will access slide indicia reader 27 upon receipt of the first detect signal, and couple the digital information developed in response to the slide identification indicia 20 last read by slide indicia reader 27 to the same storage location.

Routine sequencer 23 will now develop another second control signal which is coupled to slide table positioning mechanism 30, microscope optical scanner 31 and cell characteristic analyzer 32. This second control signal causes slide table positioning mechanism 30 to move slide table 26 such that another particular area 34 of slide 21 is moved within the field of magnification of microscope 12. The area 34 is scanned by microscope optical scanner 31 which develops optical scanning signals in the presence of a cell, which are coupled to cell characteristic analyzer 32. Cell characteristic analyzer 32 develops binary signals defining a binary word which represents the characteristics of a cell in the scanned area and couples these signals to comparators 36 through 39. Comparators 36 through 39 compare these signals with the binary signals coupled from the storage areas in characteristics memory 40. Should a correlation again occur, the correlation will be counted by one of counters 42 through 45. If a correlation does not occur routine sequencer 23 will again develop a detect signal. The detect signal is coupled to information memory 46 causing information memory 46 to access routine sequencer 23, comparator 36 and slide indicia reader 27 coupling the last developed first and second control signals, the binary signals and the digital information developed in response to slide identification indicia 20 to another memory location in information memory 46.

Routine sequencer 23 continues to develop a sequence of second control signals until each particular area 34 on slide 21 has been moved into the field of magnification of microscope 12, scanned and analyzed; or at least a sufficient number of cells have been analyzed. Each cell which is identified by a correlation in one of comparators 36 through 39 is counted by one of counters 42 through 45. Those cells which are unidentifiable cause routine sequencer 23 to develop a first detect signal. Information memory 46 stores the first and second control signals last developed, binary signals and the digital information developed in response to slide identification indicia in a new storage location in response to each first detect signal.

When the sample on a slide 21 has been analyzed sufficiently, routine sequencer 23 will develop a third control signal which is coupled to slide storage retrieval mechanism 22 to cause slide carriage 24 to lift slide 21 from microscope slide table 26 and return slide 21, via track 25, to its proper position in cassette 11. Upon return of the first slide 21 to cassette 11, routine sequencer 23 will develop another first control signal. This first control signal is coupled to slide storage retrieval mechanism 22 causing a second slide 21 in cassette 11 to be accessed by slide carriage 24 and coupled to microscope slide table 26. Routine sequencer 23 will now develop another sequence of second control signals causing each particular area 34 on this second slide 21 to be moved into the field of magnification of microscope 12. As each area 34 on slide 21 is moved within the field of magnification of microscope 12, the area is scanned by microscope optical scanner 31, and any cell located therein is analyzed by cell characteristic analyzer 32. If a cell having particular known characteristics is detected by comparators 36 through 39, it will be counted by one of counters 42 through 45. If an unidentifiable cell is detected, the first and second control signals developed by routine sequencer 23 and indicative of the XY coordinates of a particular area 34, on the particular slide 21, will be stored in a new location of information memory 46, along with the digital information from slide indicia reader 27 and the binary signals from comparator 36. When this second slide 21 has been scanned, routine sequencer 23 will develop another third control signal. This third control signal is coupled to slide storage and retrieval mechanism 22 causing slide storage mechanism 22 to return the slide 21 to its position in cassette 11.

The sequence of first, second and third control signals will continue for each slide in cassette 11. When every slide in cassette 11 has been analyzed and returned to the cassette, routine sequencer 23 will develop a sequence complete signal. The sequence complete signal is coupled to a visual indicator 47 on control panel 15 informing the technician that the analysis sequence has been completed. The technician, when he returns to the analyzer after performing profitable and productive work, will note the sequence complete indication from visual indicator 47. He then, can actuate a sequence review switch 48 on control panel 15 to develop a sequence review signal which is coupled to routine sequencer 23, to access the first information storage location in information memory 46 and couple the first and second control signals and the digital information stored therein to routine sequencer 23. Routine sequencer 23 will couple this accessed first control signal to slide storage retrieval mechanism 22 which in response to the first control signal, will access the particular slide 21 in cassette 11 corresponding to that particular first control signal and move that slide to microscope slide table 26. As the particular slide 21 passes slide indicia reader 27 the slide identification indicia 20 located thereon will be read by slide indicia reader 27, converted to digital information, and the digital information will be coupled to routine sequencer 23. If the digital information coupled from slide indicia reader 27 to routine sequencer 23 from slide indicia reader 27 correlates with the digital information coupled to routine sequencer 23 from information memory 46, routine sequencer 23 will couple the second control signal received from information memory 46 to slide table positioning mechanism 30. Slide table positioning mechanism 30 is operative upon receipt of the particular second control signal to move to XY coordinates for the particular area 34 on slide 21 associated with that particular second control signal within the field of magnification of microscope 12. The technician then can visually observe the unidentified cell via microscope 12 or via TV camera 49 and TV monitor 13. In addition, the binary signals, first and second control signals and digital information, stored in that particular storage location of information memory 46, are coupled to cathode ray tube 14 for visual observation by the technician. Information memory 46 can include circuitry for converting this stored information to a form which is readable by the technician when displayed by cathode ray tube 14.

Should the technician identify the cell being observed as a variation of one of those identifiable cells to be counted, he may actuate one of a number of particular cell identification switches 50 on control panel 15, which via the routine sequencer, is coupled to the appropriate one of counters 42 through 45.

Should the technician fail to identify the observed cell, or identify it as dirt or other foreign matter, routine sequencer 23 will, after a defined period of time access the next storage location in information memory 46 and couple the first and second control signals, the binary signals and digital information located therein to routine sequencer 23. If the first control signal and the digital information are the same as the first control signal and digital information for the slide last reviewed, routine sequencer 23 will couple the accessed second control signal to slide table positioning mechanism 30 which then is operative upon receipt of the particular second control signal to move to the XY coordinates for the particular area 34 on slide 21 associated with that particular control signal. The technician now can visually observe the unidentified cell at this particular area 34 of slide 21.

If the first control signal and digit information are not the same as for the slide last reviewed, routine sequencer 23 will develop a third control signal to return the first accessed slide 21 to its proper location in cassette 21. The above described sequence with respect to the first slide reviewed will be repeated for a second slide 21 in cassette 11 identified by the first and second particular control signals and the digital information coupled to routine sequencer 23 from the next storage location in information memory 46. This review sequence will continue until each storage location in information memory 46 has been accessed and every slide having unidentified cells thereon accessed for visual observation. If the technician wishes to visually observe any cell for an extended period of time he will depress sequence hold switch 51 on control panel 15 thus halting the continuation of the review sequence.

If it is desired to store first and second control signals, binary signals and digital information for one of the identifiable cells, the technician can depress one of identifiable cell store switches 52. The identifiable cell store switch will develop a cell store signal which is coupled to routine sequencer 23 such that during the automatic analysis of the cells in each area on each slide 21 in cassette 11 a second detect signal will develop in response to the cell store signal and to a comparison signal from one of comparators 36 through 39 corresponding to a detection of the particular type of identifiable cell. This second detect signal is coupled to information memory 46 causing information memory 46 to access routine sequencer 23, comparator 36 and slide indicia reader 27 and store the first and second control signals, binary signals and digital information last developed in an empty storage location of information memory 46. Upon initiation of the review cycle, the storage areas in information memory 46 containing the first and second control signals, digital information and binary signals for the particular identifiable cells to be stored will also be accessed by routine sequencer 23. Routine sequencer 23, in response to the first and second control signals and digital information coupled thereto for each identifiable cell stored, will access the particular slide 21 corresponding to the first control signal and automatically scan to the particular area 34 on the slide 21 associated with the stored second control signal. The technician then can observe visually, via microscope 12 or camera 49 and TV monitor 13, each cell having particular identifiable characteristics on each slide 21 in cassette 11.

In the preferred embodiment, an automatic biological cell analyzer and system for automatically reviewing slides having cells thereon has been shown. Although the preferred embodiment described a system for analyzing blood cells, the system may be used for other biological cells, for example cancer cells, urine cells or fat cells. It should be noted that a number of system components other than those shown, or in a different form than that shown can be employed in order to provide the functional operation of the system of this invention. For example, routine sequencer 23 can consist of a magnetic tape and transport with the entire sequence entered on the magnetic tape in the form of electromagnetic signals. In the alternative, routine sequencer 23 can be a central processing unit. Furthermore, information memory 46 can be a separate memory with a number of storage locations or a part of a central processor including routine sequencer 23. Characteristics memory 40, comparators 36 through 39 and counters 42 through 45 can all be separate components or a part of a central processing unit including routine sequencer 23 and information memory 46.

It also should be noted that certain functions and sequential operations of the automatic biological cell analyzer can be changed or eliminated in order to suit the users requirements. For example, the review sequence can be modified such that upon actuation of sequence review switch 48, all of the steps previously described with respect to reaccessing a particular slide 21 will be performed, except for coupling the second control signal to slide table positioning mechanism 30 for automatically moving the particular area 34 on slide 21 within the field of magnification of microscope 12. As previously noted, the second control signal, corresponding to the XY coordinates of the particular area 34 on slide 21 will be displayed via cathode ray tube 14. Slide table positioning mechanism 30 is coupled to control stick 16 and responsive to movement of control stick 16 to move particular areas 34 of slide 21 with the field of magnification of microscope 12. The technician, using the information displayed on cathode ray tube 14, can operate control stick 16 and move particular area 34 on slide 21 within the field of magnification of microscope 12.

During the review cycle, routine sequencer 23, after a defined period of time, does not have to automatically access the next storage location. In the alternative, the technician can actuate sequence review switch 48, after studying a particular area 34 on a reaccessed slide 21, in order to access the next storage location in information memory 46.

Certain functions and sequential operations of the automatic biological cell analyzer also can be added in order to suit the users requirements. In high magnification microscopy it is customary to employ an immersion oil between the microscope optics and slide 21. As high magnification microscopy is employed in the preferred embodiment, a slide oiler mechanism 53, (FIG. 4) is coupled to routine sequencer 23. As each slide 21 is moved to microscope slide table 21 by slide storage retrieval mechanism 22 in response to a first control signal, slide 21 will pass slide oiler mechanism 53. Slide oiler mechanism 53 will operate in response to a fourth control signal from routine sequencer 23 to eject a measured amount of oil onto the front and back surface of slide 21. The oil will be ejected onto slide 21 in a manner which prevents the formation of air bubbles in the oil applied to slide 21. The oil used will have a viscosity and surface tension such that it will adhere to the front and back sides of slide 21.

What it is desired to secure by Letters Patent of the United States is:

1. A system for automatically reviewing slides having biological cells thereon including in combination sequencer means for developing a sequence of first control signals and a sequence of second control signals, storage means for storing a plurality of slides to be studied, scanning means coupled to said sequencer means and said storage means and operative in response to each particular first control signal in said sequence to access a particular slide in said storage means, said scanning means being further operative in response to each particular second control signal in said sequence to locate a particular area on the accessed slide, analyzing means coupled to said scanning means and said sequencer means for analyzing and detecting particular characteristics of each cell scanned on the accessed slide, said analyzing means being operative to develop a detect signal in response to each cell having characteristics other than said particular characteristics, memory means coupled to said sequencer means and said analyzing means and having a plurality of storage locations, said memory means being operative in response to said detect signal to store in a particular storage location, said last developed first and second control signals, said sequencer means including input means operative to develop a review signal, sequentially to access each of said plurality of storage locations and couple said particular first and second control signals located therein to said scanning means, said scanning means being operative in response to said particular first and second control signals to access said particular slide and locate said particular area thereon.

2. The system of claim 1 wherein said scanning means further includes observation means for visually observing cells on the accessed slide.

3. The system of claim 1 wherein said sequencer means is a central processing unit.

4. The system of claim 1 wherein said sequencer means, a portion of said analyzing means and said memory means are portions of a central processing unit.

5. The system of claim 1 wherein the slides have slide identification indicia thereon, and further including slide indicia scanner means coupled to said memory means, said slide indicia scanner means being operative to scan said accessed slide identification indicia and develop a slide identification signal therefrom, said memory means further being operative in response to said detect signal to store said last developed slide identification signal in said particular storage location.

6. The system of claim 5 wherein said slide indicia scanner means further is coupled to said sequencer means, said sequencer means further being operative in response to said review signal to compare said slide identification signal of the last accessed slide with said slide identification signal in said particular storage location.

7. The system of claim 1 wherein said analyzing means includes cell characteristic analyzer means coupled to said scanning means and operative in response thereto to develop characteristic signals, and comparison means coupled to said cell characteristic analyzer means and operative to compare said characteristic signals for said scanned cell with characteristic signals for particular characteristics of particular types of cells and develop said detect signal in response to a lack of correlation therebetween.

8. The system of claim 7 wherein said comparison means is constructed and arranged to develop a second detect signal in response to a correlation between said characteristic signals for said scanned cell and said characteristic signals for particular characteristics of particular types of cells.

9. The system of claim 1 wherein said scanning means includes microscope means coupled to said sequencer means and operative in response to said second control signal to move to said particular area on the accessed slide, and slide storage retrieval means coupled to said microscope means and said sequencer means and operative in response to said first control signal to access the slide and couple same to said microscope means.

10. The system of claim 9 wherein said microscope means includes optical means having a slide viewing field, a slide table for holding said accessed slide, and a slide table positioning mechanism coupled to said slide table and said sequencer means, said slide table positioning mechanism being operative in response to said second control signal to move said particular area on said accessed slide to said slide viewing field.

11. The system of claim 10 wherein said slide storage and retrieval mechanism includes accessing means coupled to said storage means for accessing each of said storage slides and carriage means coupled to said storage means and said microscope slide table for moving said accessed slide to said slide table.

12. The system of claim 9 wherein said analyzing means includes optical scanner means coupled to said microscope means for optically scanning said particular area and cell thereon and developing scanning signals, cell characteristic analyzer means coupled to said optical scanner means and operative in response to said scanning signals to develop characteristic signals, and comparison means coupled to said cell characteristic analyzer means and operative to compare said characteristic signals for said scanned cell with characteristic signals for particular characteristics of particular types of cells and develop said detect signal in response to a lack of correlation therebetween.

13. The system of claim 12 wherein said comparison means includes characteristic memory means coupled to said cell characteristic analyzer means for storing said characteristic signals for particular characteristics of particular types of cells, and comparator means coupled to said characteristic memory means and said cell characteristic analyzer means, said comparator means being operative to compare said characteristic signals developed by said cell characteristic analyzer means and said stored characteristic signals and develop said detect signal in response to a lack of correlation therebetween, said comparator means being further operative to develop a second detect signal in response to a correlation therebetween.

14. The system of claim 13 wherein said comparison means further includes counter means coupled to said comparator means and operative to count each of said second detect signals.

15. The system of claim 13 wherein said characteristic memory means includes a plurality of storage areas for storing a plurality of said characteristic signals for said particular type of cells, and said comparator means includes a plurality of comparators for comparing said characteristic signals developed by said cell characteristic analyzer means with said plurality of characteristic signals in said plurality of storage areas.

16. The system of claim 13 wherein said memory means includes storage control means operative in response to a stored signal coupled thereto to store said last developed control signals, said input means being constructed to develop a plurality of particular input signals, said sequencer means being constructed to respond to said particular input signals and said second detect signal to develop said detect signal.

17. The system of claim 16 wherein the slides have slide identification indicia thereon, and further including slide indicia scanner means coupled to said memory means, said slide indicia scanner means being operative to scan said accessed slide identification indicia and develop a slide identification signal therefrom, said memory means further being operative in response to said detect signal to store said last developed slide identification signal in said particular storage location.

18. The system of claim 17 wherein said slide indicia scanner means further is coupled to said sequencer means, said sequencer means further being operative in response to said review signal to compare said slide identification signal of the last accessed slide with said slide identification signal in said particular storage location.

19. The system of claim 18 wherein said scanning means further includes observation means for visually observing cells on the accessed slide.

20. The system of claim 18 wherein said sequencer means is a central processing unit.

21. The system of claim 18 wherein said sequencer means, a portion of said analyzing means, and said memory means are portions of a central processing unit.

22. The system of claim 1 wherein said scanning means further is operative upon access of said slide to oil said slide.

23. The system of claim 9 wherein said scanning means further includes slide oiler means coupled to said sequencer means and operative in response to a fourth control signal to oil said slide.

24. A system for automatically reviewing slides having biological cells thereon wherein the slides are stored in a particular location of a storage device including in combination accessing means for accessing sequentially each stored slide in said storage device and recognizing the storage location of an accessed slide, scanning means coupled to said accessing means for receiving the slide accessed, said scanning means being operative upon receipt of the slide accessed to locate sequentially particular areas on the accessed slide, analyzing means coupled to said scanning means for recognizing the presence of a cell on a particular area of the accessed slide, said analyzing means being operative upon recognition of said cell to identify said cell as one of a known type and an unknown type, memory means having a plurality of memory locations coupled to said analyzing means, scanning means and accessing means for storing in a memory location said recognized accessed slide storage location and cell particular area on the accessed slide in response to identification of said cell as an unknown type, and circuit means coupled to said accessing means, said scanning means and said memory means and operative to access sequentially each of said plurality of memory locations, said accessing means being operative in response to a memory location being accessed to reaccess said slide storage location stored therein, said scanning means being operative in response to said memory location being accessed to receive the slide reaccessed and locate on the reaccessed slide the particular area stored in said memory location.

25. A method for reviewing in an automated system a plurality of slides having biological cells thereon which includes a storage means for storing a plurality of slides and an information memory means, and wherein said review is initiated by a review signal, the steps of:

A. Accessing a stored slide in a particular slide location in said storage means;

B. Sequentially locating a plurality of particular areas on said accessed slide;

C. Automatically analyzing and identifying each cell on said slide;

D. Storing the accessed slide particular storage location and the particular area of each cell analyzed having unidentifiable characteristics in a memory location in said information memory means;

E. Returning the slide to said particular slide location in said storage means;

F. Repeating steps A, B, C, D and E for each of said plurality of slides;

G. Sequencing through each memory location in said information memory means containing said accessed slide particular storage location and said particular area of each cell having identifiable characteristics upon initiation of said review signal; and H. Sequentially reaccessing each slide having unidentifiable cells thereon in response to said stored slide location information.

26. The method of claim 25 further including the step of automatically locating the particular area of each cell having unidentifiable characteristics on each reaccessed slide in response to said stored cell location information.

27. The method of claim 26 further including the step of storing the accessed slide particular storage location and the particular area on said slide for a cell having particular identifiable characteristics in a memory location.

28. The method of claim 27 wherein the system further includes visual observation means, and further including the step of providing visual observation of each slide reaccessed and each cell thereon.

29. The method of claim 26 wherein said system further includes sequencer means for developing a sequence of first control signals and a sequence of second control signals, and wherein said steps of accessing and sequentially locating the slide areas further includes the steps of accessing a slide in said storage means in response to a particular first control signal in said sequence, and locating a particular area on said accessed slide in response to a particular second control signal in said sequence.

30. The method of claim 29 wherein said step of storing each accessed slide location and the particular area of each analyzed cell having unidentifiable characteristics includes the step of storing said last developed first and second control signals in said memory location.

31. The method of claim 29 wherein said step of accessing a slide in said storage means includes the step of oiling said accessed slide.

32. In a method for automatically retrieving slides from a storage device for reexamining specific biological cells thereon, the cells previously having been examined during an examination mode and the area of each specific cell having been recorded automatically, the steps of:

accessing automatically from the storage device a slide having thereon at least one of the specific cells to be reexamined;

placing the slide in a reexamination orientation, said placing including automatically reaccessing the area on the slide of each specific cell automatically recorded.

* * * * *